(12) United States Patent
Tuffs

(10) Patent No.: US 10,705,885 B2
(45) Date of Patent: Jul. 7, 2020

(54) AUTOSCALING OF DATA PROCESSING COMPUTING SYSTEMS BASED ON PREDICTIVE QUEUE LENGTH

(71) Applicant: PALO ALTO NETWORKS, INC., Santa Clara, CA (US)

(72) Inventor: Philip Simon Tuffs, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 103 days.

(21) Appl. No.: 15/885,520

(22) Filed: Jan. 31, 2018

(65) Prior Publication Data

US 2019/0235932 A1 Aug. 1, 2019

(51) Int. Cl.
*G06F 1/24* (2006.01)
*G06F 9/50* (2006.01)
*G06F 1/26* (2006.01)
*G06F 9/4401* (2018.01)
*G06F 8/65* (2018.01)

(52) U.S. Cl.
CPC ............ *G06F 9/5094* (2013.01); *G06F 1/266* (2013.01); *G06F 9/4418* (2013.01); *G06F 9/5011* (2013.01); *G06F 8/65* (2013.01)

(58) Field of Classification Search
CPC .... G06F 9/5094; G06F 9/5011; G06F 9/4418; G06F 1/266
USPC ........................................................ 713/100
See application file for complete search history.

(56) References Cited

U.S. PATENT DOCUMENTS

| 2007/0076733 A1* | 4/2007 | Bosseler | G06F 3/1218 370/412 |
| 2008/0002603 A1* | 1/2008 | Hutsell | G06F 1/3203 370/318 |
| 2015/0113120 A1 | 4/2015 | Jacobson et al. | |
| 2016/0021011 A1* | 1/2016 | Vasseur | H04L 47/127 370/235 |
| 2016/0077565 A1* | 3/2016 | Jayaseelan | G06F 9/546 713/340 |
| 2016/0139639 A1* | 5/2016 | Dash | G06F 1/26 714/773 |
| 2017/0123700 A1* | 5/2017 | Sinha | G06F 3/065 |
| 2018/0278567 A1* | 9/2018 | Archer | H04L 51/26 |

OTHER PUBLICATIONS

Yuan, et al., (Dec. 4, 2013) "Scryer: Netflix's Predictive Auto Scaling Engine—Part 2". Retrieved on the Internet from http://techblog.netflix.com/2013/12/scryer-netflixs-predictive-auto-scaling.html, on Jan. 31, 2018.

* cited by examiner

*Primary Examiner* — Volvik Derose
(74) *Attorney, Agent, or Firm* — Gilliam IP PLLC

(57) ABSTRACT

Described herein are systems, methods, and software to enhance the scaling of data processing systems in a computing environment. In one implementation, a method of operating a data processing management system includes monitoring a queue length in an allocation queue for data processing system, and generating a prediction of the allocation queue based on the monitored queue length. Once the prediction is generated, the data processing management system may modify an operational state of at least one data processing system based on the prediction of the queue length and a processing time requirement for data objects in the allocation queue.

18 Claims, 8 Drawing Sheets

DATA STRUCTURE
500

| MONITORED QUEUE LENGTH 510 | OBJECT INPUT RATE 511 | PROCESSING RATE 512 | PREDICTED QUEUE LENGTH 513 |
|---|---|---|---|
| QUEUE LENGTH 520 | RATE 525 | RATE 530 | QUEUE LENGTH 540 |
| QUEUE LENGTH 521 | RATE 526 | RATE 531 | QUEUE LENGTH 541 |
| QUEUE LENGTH 522 | RATE 527 | RATE 532 | QUEUE LENGTH 542 |
| QUEUE LENGTH 523 | RATE 528 | RATE 533 | QUEUE LENGTH 543 |
| QUEUE LENGTH 524 | RATE 529 | RATE 534 | QUEUE LENGTH 544 |

FIGURE 5

AUTOSCALING OF DATA PROCESSING COMPUTING SYSTEMS BASED ON PREDICTIVE QUEUE LENGTH

TECHNICAL BACKGROUND

An increasing number of operations within a data center consist of distributed data processing across multiple computing systems. In particular, an organization may implement multiple computing systems to maintain and process large data sets, wherein data objects from the data sets may be distributed to the computing systems to process the objects in parallel. These objects may include text files, images, videos, spreadsheets, or some other similar type of data object. However, while multiple computing systems may provide efficiency in the parallel processing of large data sets, difficulties often arise in determining the number of computing systems that are required to provide the desired operation. For example, an organization may not employ enough computing systems to process a data set within a required time period. Similarly, an organization may execute too many computing systems to process a data set, which causes power and hardware inefficiencies for the organization, leading to increased operating costs.

SUMMARY

The technology described herein enhances the scaling of data processing systems in a computing environment. In one implementation, a method of operating a data processing management system includes monitoring a queue length in an allocation queue for data processing by data processing systems, and generating a prediction of the allocation queue based on the monitored queue length. The method further includes modifying an operational state of at least one data processing system of the data processing systems based on the prediction of the queue length and a processing time requirement for data objects in the allocation queue.

BRIEF DESCRIPTION OF THE DRAWINGS

FIG. 5 illustrates a data structure for identifying predicted queue lengths according to an implementation.

DETAILED DESCRIPTION

Figure 1:
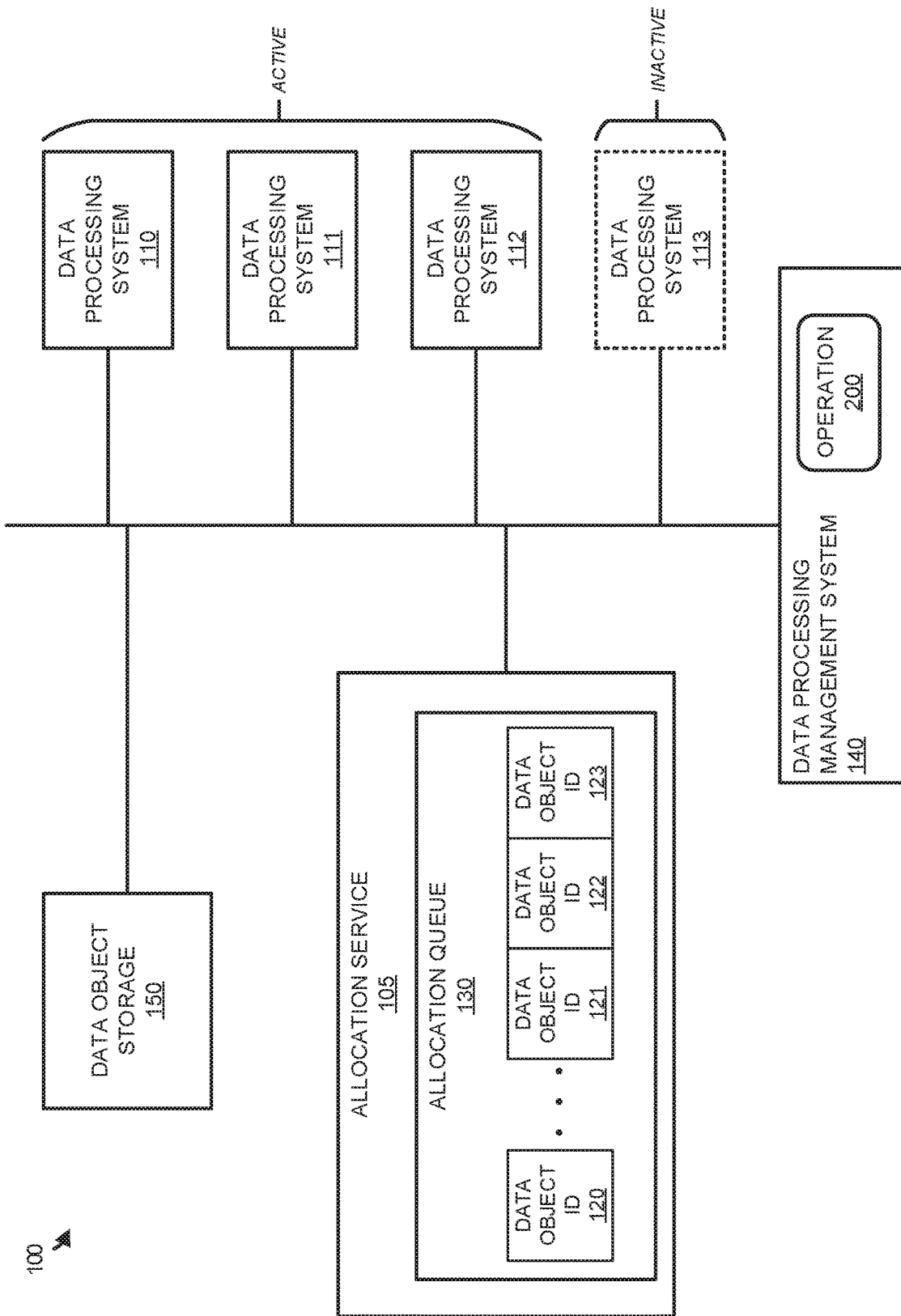
FIG. 1 illustrates a computing environment for processing data objects according to an implementation.

FIG. 1 illustrates a computing environment 100 for processing data objects according to an implementation. Computing environment 100 includes allocation service 105, data object storage 150, data processing systems 110-113, and data processing management system 140. Data processing management system 140 is further configured to provide operation 200, which is described further in FIG. 2.

In operation, data processing systems 110-113 comprise computing systems, such as server computers, desktop computers, and the like, that execute software to process data objects from data object storage 150. To allocate individual data objects to each of the data processing systems, computing environment 100 includes allocation service 105 with allocation buffer 130. Allocation buffer 130 includes data object identifiers 120-123 that correspond to data objects stored in data object storage 150. When a data object identifier is placed in allocation buffer 130, one of the active data-processing systems 110-112 will select and remove it from the allocation queue 130, and execute the appropriate computations on it. If the computation fails, the data object is returned to the allocation queue for one-or-more subsequent attempts at processing, before it is placed in a "deadletter" queue of failed data objects. In particular, allocation service 105 may monitor for an available data processing system capable of providing operations on the data object, and once identified, the corresponding data object may be provided to the data processing system. Once obtained by the data processing system, the data processing system may perform the required operations on the data object. This data processing may depend on the data object, wherein processing may include image processing, text based processing, machine learning operations, or some other similar data processing. In some implementations, allocation service 105 may be responsible for providing the data object to the individual data processing system. In other implementations, allocation service 105 may notify the data processing system of the particular data object, and the data processing system may retrieve the corresponding object from data object storage 150.

In addition to the operations provided by allocation service 105 in conjunction with data processing systems 110-113 and data object storage 150, computing environment 100 further includes data processing management system 140. Data processing management system 140 is responsible for managing power or operational states of data processing systems 110-113 based on the predicted size of allocation buffer 130. In managing the power or operational states of the data processing systems, data processing management system 140 may power on the processing systems, power off the processing systems, wake from sleep the processing systems, put to sleep the processing systems, or provide some other similar operation on a processing system in response to a change in the allocation buffer. As a result of the operations of data processing management system 140, computing environment 100 may dynamically modify the computing resources that are allocated to processing a particular data set. In this manner, when the load is high in the environment, additional resources may be provided, whereas when the load is lower, a lesser amount of processing resources may be provided.

Figure 2:
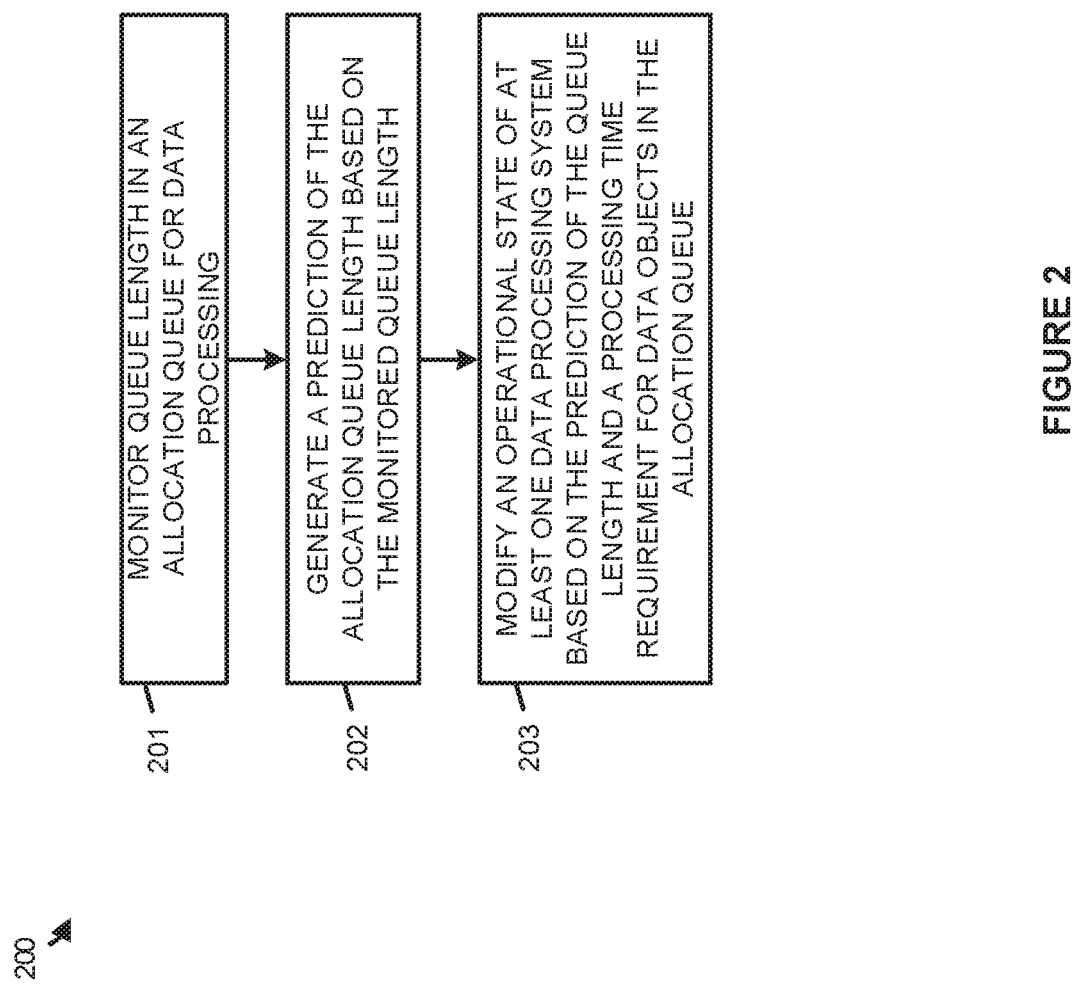
FIG. 2 illustrates an operation of a data processing management system according to an implementation.

FIG. 2 illustrates an operation 200 of a data processing management system according to an implementation. The processes of operation 200 are referenced parenthetically in the paragraphs that follow with reference to systems and elements of computing environment 100 of FIG. 1.

As depicted, operation 200 on data processing management system 140 monitors (201) a queue length in an allocation queue for data processing by data processing systems of the computing environment. In monitoring the queue, data processing management system 140 may identify various information from computing environment 100 related to allocation queue 130. This may include the current queue length in allocation buffer 130 at various times, the current rate of processing by the active data processing systems, the current rate of incoming data objects to the buffer, or some other similar information regarding the flow of data objects through allocation buffer 130. In some implementations, the information may be gathered from allocation service 105. However, it should be understood that additional or supplemental information may be gathered from data processing systems 110-113. In some implementations, data processing management system 140 may programmed with a predicted processing rate for each of the data processing systems. For example, data processing system 110 may be capable of processing a particular number of data objects per hour, while data processing system 111 may be capable of processing a different number of data objects per hour. As a result, part of the queue length monitoring may include information about the processing rate of data objects by the data processing systems.

While monitoring the queue length, operation 200 further includes generating (202) a prediction of the allocation queue based on the monitored queue length. In some implementations, in generating the prediction of allocation queue 130, data processing management system 140 may identify the queue length in allocation queue 130 at two or more times. For example, data processing management system 140 may identify a current length of allocation queue 130 and a queue length for allocation queue 130 five minutes prior to the current length. From these queue lengths, data processing management system 140 may identify a predicted queue length. In some implementations, in addition to using the aggregated queue length for the instances in the environment, data processing management system 140 may further consider other information from monitoring the queue length in allocation queue 130. This information may include a current processing rate for the available data processing nodes, a current rate of incoming data objects to allocation queue 130, or some other similar information regarding allocation queue 130. In some examples, data processing management system 140 may be configured with information about the predicted processing rate for the various data processing systems, wherein the processing rate may be equivalent for each of the data processing systems or may be different for each of the data processing systems. For example, data processing system 110 may be capable of processing data objects at a first rate, while data processing system 111 may be capable of processing data objects at a second rate. Consequently, when determining the prediction of the allocation queue, data processing management system 140 may aggregate the processing rate of the individual data processing systems to determine a current rate of processing rate of the entire computing environment. Additionally, in identifying the predicted queue length of the allocation queue, data processing management system 140 may also identify the current and anticipated future rate of incoming data objects of the queue, which may be combined with the processing rate to determine the rate of objects coming into the queue in relation to the objects leaving the queue to predict the queue length for at least one future time.

Once the prediction of allocation queue 130 is determined, operation 200 further modifies (203) an operational state of at least one data processing system based on the prediction of the queue length and a processing time requirement for data objects in allocation queue 130. Referring to an example in computing environment 100 of FIG. 1, after identifying the prediction of the allocation queue, data processing management system 140 may initiate data processing system 113 to support the required operations on the data objects of allocation queue 130 if additional processing systems are required. This initiation may include initiating a state change in data processing system 113 from an off state to an on state, initiating a state change in data processing system 113 from a sleep state to an active state, or some other similar operation to make the data processing system available to process data objects in computing environment 100. In contrast, if less processing resources are required to process the data objects of the allocation queue, data processing management system 140 may modify the state of one or more data processing systems data processing systems 110-112 to reduce the amount of resources used in computing environment 100. Modifying the state of a data processing system of data processing systems 110-112 may include initiating a state change in a data processing system from an on state to an off state, initiating a state change in a data processing system from an active state to a sleep state, or some other similar operation to reduce the quantity of data processing systems available to process data objects in computing environment 100.

In some implementations, administrators of computing environment 100 may define processing time requirements for data objects to be processed. The processing time requirements may comprise a target time for completing processing on each data object in the queue (e.g. three hours), a maximum time for completing processing on each data object in the queue (e.g. a day), or some other similar time requirement, including combinations thereof. For example, an administrator of the computing environment may define that each of the data objects should be processed in a target time of three hours. As a result, based on the defined target from the administrator, data processing management system 140 may modify operational states of data processing systems 110-113 to ensure that the objects are processed in the desired time based on the predicted queue length of allocation queue 130.

In some examples, in determining how to modify the operational states of the one or more data processing systems, data processing management system 140 may use thresholds and/or criteria for determining whether an operational modification should be made to a data processing system. In one implementation, the criteria may be based on a current predicted time to complete the predicted allocation queue in relation to a desired processing time requirement for data objects in the allocation queue. For example, if the predicted allocation queue were predicted to, using the currently operational data processing systems, take a period of time that exceeded a time threshold, then data processing management system 140 may be used to modify an operational state of a data processing system to make the data processing system available in the computing environment. Similar operations may also be used when the predicted allocation queue is predicted to take a period of time that falls below a time threshold using the current processing system configuration, wherein data processing management system 140 may be used to modify the operational state of at least one data processing system to make the processing system unavailable for future processing. In this manner, as additional or lesser resources are required for the predicted allocation queue load, data processing management system 140 may dynamically modify the available systems to process the required data objects.

In some implementations, in determining which of the data processing systems to make active or inactive within the computing environment, data processing management system 140 may consider the data processing rate for each of the data processing systems. For example, based on the requirement of additional or lesser resources, data processing management system 140 may make active or inactive data processing systems that most efficiently provide the adequate data processing resources for allocation queue 130. Thus, if a smaller amount of additional resources were required, data processing management system 140 may initiate a data processing system with a lesser amount of resources and lower data processing rate, whereas if data processing system identified that a larger amount of additional resources was required, data processing management system 140 may initiate a data processing system with a larger amount of resources and higher processing rate.

Figure 3:
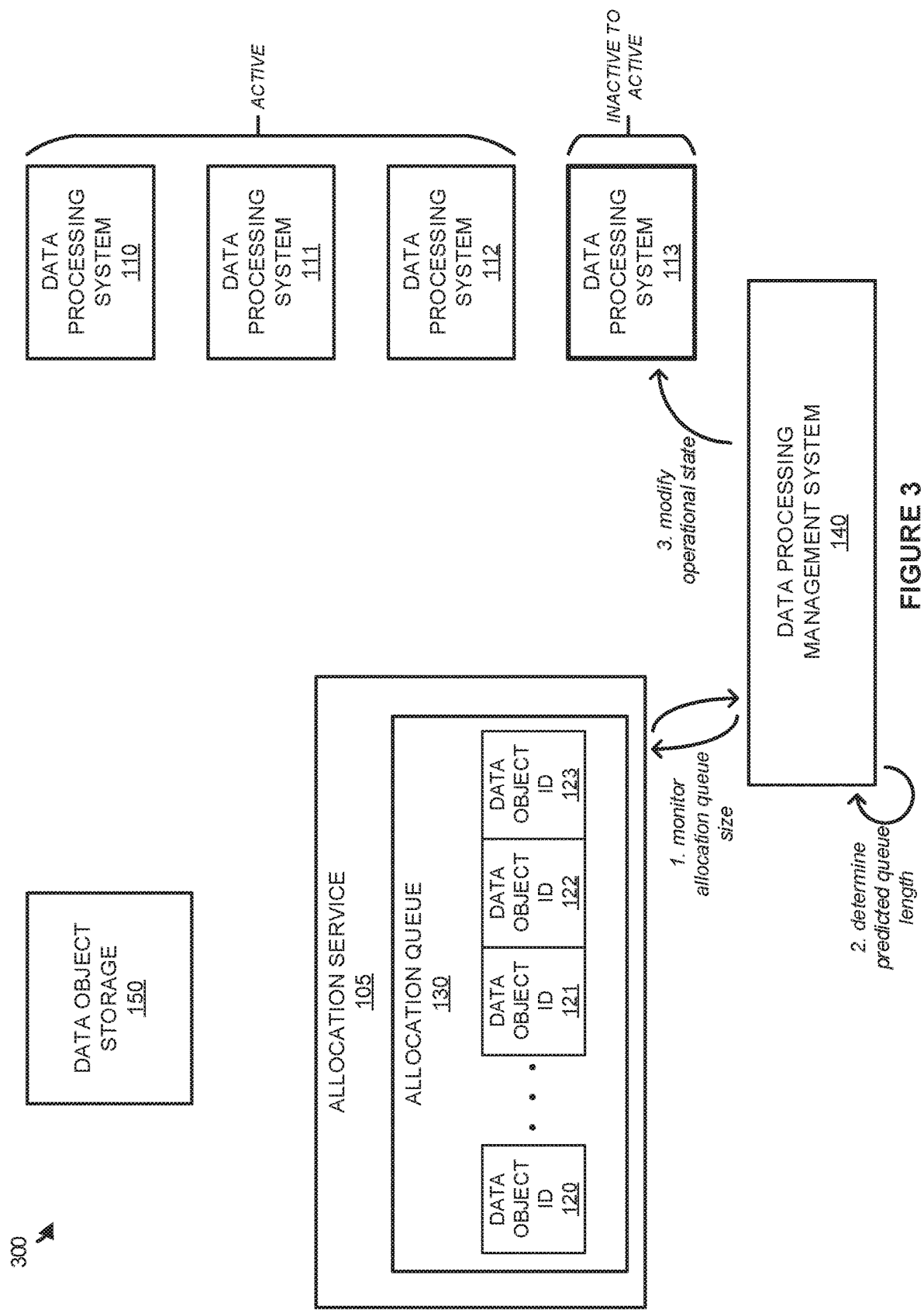
FIG. 3 illustrates an operational scenario of modifying an operational state of a data processing computing system according to an implementation.

FIG. 3 illustrates an operational scenario 300 of modifying an operational state of a data processing system according to an implementation. Operational scenario 300 includes systems and elements of computing environment 100 of FIG. 1.

As described herein allocation service 105 is used to maintain allocation queue 130 that manages the allocation of data objects for processing by data processing systems 110-113 from data object storage 150. Data processing systems operate by identifying data objects at the front of the queue as they finish prior data object computations, and may process the object from data object storage 150. In the present implementation, data processing systems 110-112 are active in the environment and capable of processing data objects from data object storage 150, while data processing system 113 is inactive (turned off, in a sleep state, or otherwise in a lower power mode).

Here, at step 1, data processing management system 140 monitors the allocation queue length or size of allocation queue 130. In monitoring the allocation queue, data processing management system 140 may monitor the length of allocation queue 130 at various times, may monitor the rate at which data objects are being processed by the available data processing systems, may monitor the rate and anticipated future rate at which data objects are being added to the queue, or may monitor any other similar information related to allocation queue 130. As the information is monitored, data processing management system 140 will determine, at step 2, a predicted queue length for allocation queue 130 based on the monitored information.

In some implementations, in determining the predicted length, data processing management system 140 may consider various factors, wherein the factors may include the length of the queue at one or more times, the rate at which the data processing systems are capable of processing data objects, the rate at which data objects are being added to the queue, or any other similar information, including combinations thereof. In one example, data processing management system 140 may identify the length of the queue at a first time and at a second time, such as a time five minutes prior to the current time and the current time. Based on the length of the queue at the times, data processing management system 140 may predict a length for the queue. In another example, in monitoring the queue length, data processing management system 140 may determine trends in the length of the queue over a time period. For example, based on the time of day or time of the week, data processing management system 140 may be able to identify the queue length at that time and predict the queue length moving forward. Thus, if an organization had a similar queue length or processing requirement at a similar time each day, data processing management system 140 may be capable of predicting the queue length based on the similarity.

Once the predicted queue length is generated for allocation queue 130, data processing management may initiate, at step 3, an operational state change for at least one data processing system in the computing environment based on the predicted queue length and a processing time requirement for data objects in the allocation queue. Here, data processing management system 140 identifies that there are insufficient processing resources to accommodate the processing of objects in allocation queue 130. Consequently, data processing management system 140 transitions data processing system 113 from an inactive state to an active state. In modifying the state, data processing management system 140 may transition data processing system 113 from an off state to an on state, may transition data processing system 113 from a sleep state to an awake state, or may transition the data processing system in any other similar manner to make the data processing system available to process data objects allocated from allocation service 105.

In some implementations, in determining the quantity of data processing systems that are required to accommodate a predicted queue length, data processing management system 140 may consider the predicted queue length, a data object processing rate for the current available systems, as well as a predicted rate of incoming data objects to the queue. As a result, if the current configuration of data processing systems were incapable of satisfying the processing requirements of the predicted queue (e.g. processing time requirements for objects in the queue), data processing management system 140 may initiate one or more data processing systems to accommodate the requirements.

In some examples, in identifying whether to initiate a new data processing system within the computing environment, data processing management system 140 may be configured with criteria and/or thresholds to determine whether a new processing system is required. For example, one or more data structures may be maintained by data processing management system 140, wherein the data structures may be used to identify whether the current system configuration (e.g. the currently operational data processing systems) are capable of satisfying the predicted allocation queue length and the predicted rate of incoming data objects to the queue. If the current systems are capable of satisfying the predicted queue and predicted rate of incoming objects, then a new processing system will not be added to the computing environment. In contrast, if the current systems are incapable of satisfying the predicted queue and the predicted rate of incoming objects, then a new processing system will be added to the computing environment to ensure that the objects are processed in accordance with the processing time requirements of the queue.

Figure 4:
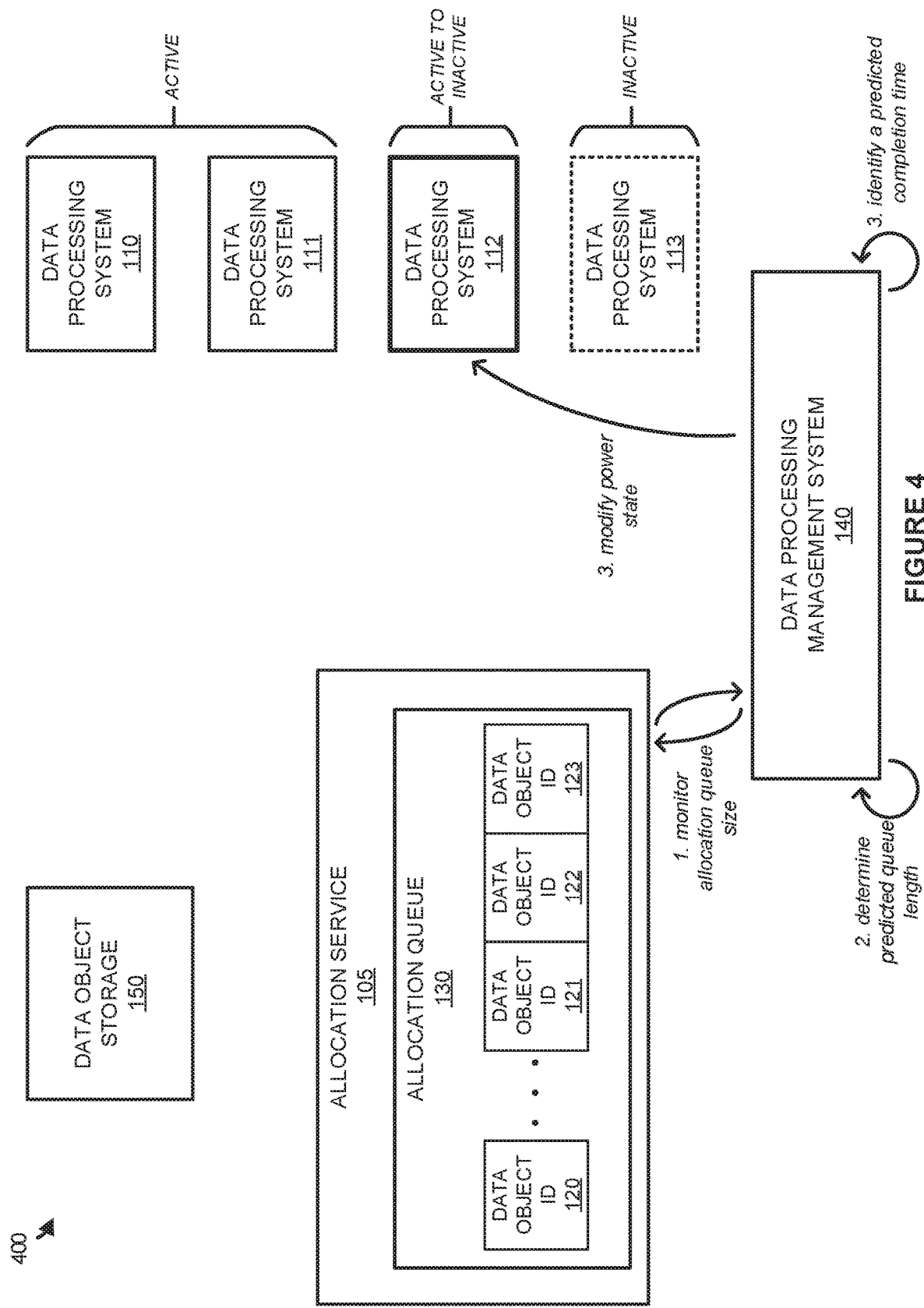
FIG. 4 illustrates an operational scenario of modifying an operational state of a data processing computing system according to an implementation.

FIG. 4 illustrates an operational scenario 400 of modifying an operational state of a data processing computing system according to an implementation. Operational scenario 400 includes systems and elements of computing environment 100 of FIG. 1. Operational scenario 400 includes many of the same processes described above with regards to operational scenario 300 in FIG. 3.

In the particular example, at step 1, data processing management system 140 monitors the allocation queue length or size of allocation queue 130. In monitoring the allocation queue, data processing management system 140 may monitor the length of allocation queue 130 at various times, may monitor the rate at which data objects are being processed by the available data processing systems, may monitor the rate at which data objects are being added to the queue, or may monitor any other similar information related to allocation queue 130. As the information is monitored, data processing management system 140 will determine, at step 2, a predicted queue length for allocation queue 130 based on the monitored information. In some implementations, in determining the predicted length, data processing management system 140 may consider various factors, wherein the factors may include the length of the queue at one or more times, the rate at which the data processing systems are capable of processing data objects, the rate at which data objects are being added to the queue, or any other similar information, including combinations thereof.

Here, once the predicted queue length is determined, data processing management system 140 modifies, at step 3, an operational state of a data processing system (data processing system 112) based on the predicted queue length and a processing time requirement for data objects in the queue. In at least one example, data processing management system 140 may be configured to identify when the predicted queue length meets particular criteria. In particular, when the queue length is too long to have the data objects within the queue processed within a required time period, then data processing management system 140 may determine that one or more additional processing systems are required to handle the processing of the data objects. Similarly, when the queue length is short enough to provide an adequate processing time of the data objects using a lesser number of processing systems, data processing management system 140 may change the operational state of a data processing system, such as data processing system 112, to put the data processing system in a lower power state (e.g. an off state or a sleep state).

FIG. 5 illustrates a data structure 500 for identifying predicted queue lengths according to an implementation. Data structure 500 includes columns for monitored queue length 510, object input rate 511, processing rate 512, and predicted queue length 513. Although demonstrated with three factors for determining the predicted queue length, it should be understood that other monitored queue length attributes may be used for determining the predicted queue length.

As described herein, a data processing management system may be used to monitor the length of the allocation queue as data objects are processed by data processing systems. In monitoring the allocation queue, a data processing management service may determine lengths of the queue, a rate of incoming data objects to the queue, and a processing rate by the data processing systems that are active within the computing environment. Here, as the queue is monitored, the data processing management system may apply the information to data structure 500 to determine a predicted queue length. For example, if the monitored information about the allocation queue identified queue length 523, rate 528 for the object input rate, and rate 533 for the object processing rate, then the data processing management system may identify a predicted queue length 543. Once the predicted queue length is identified, the data processing management system may determine whether a modification should be made to the operational state of at least one data processing system. In particular, if the currently available data processing systems are incapable of providing a required quality of service (e.g. processing time for data objects in the queue), one or more additional data processing systems may be made available to process the objects from the allocation queue. In contrast, if surplus processing resources are available to process the data objects, then one or more of the processing systems may be removed from the available data processing systems, wherein the one or more processing systems may be turned off, placed in a sleep state, or otherwise placed in a lower power mode within the computing environment.

Figure 6:
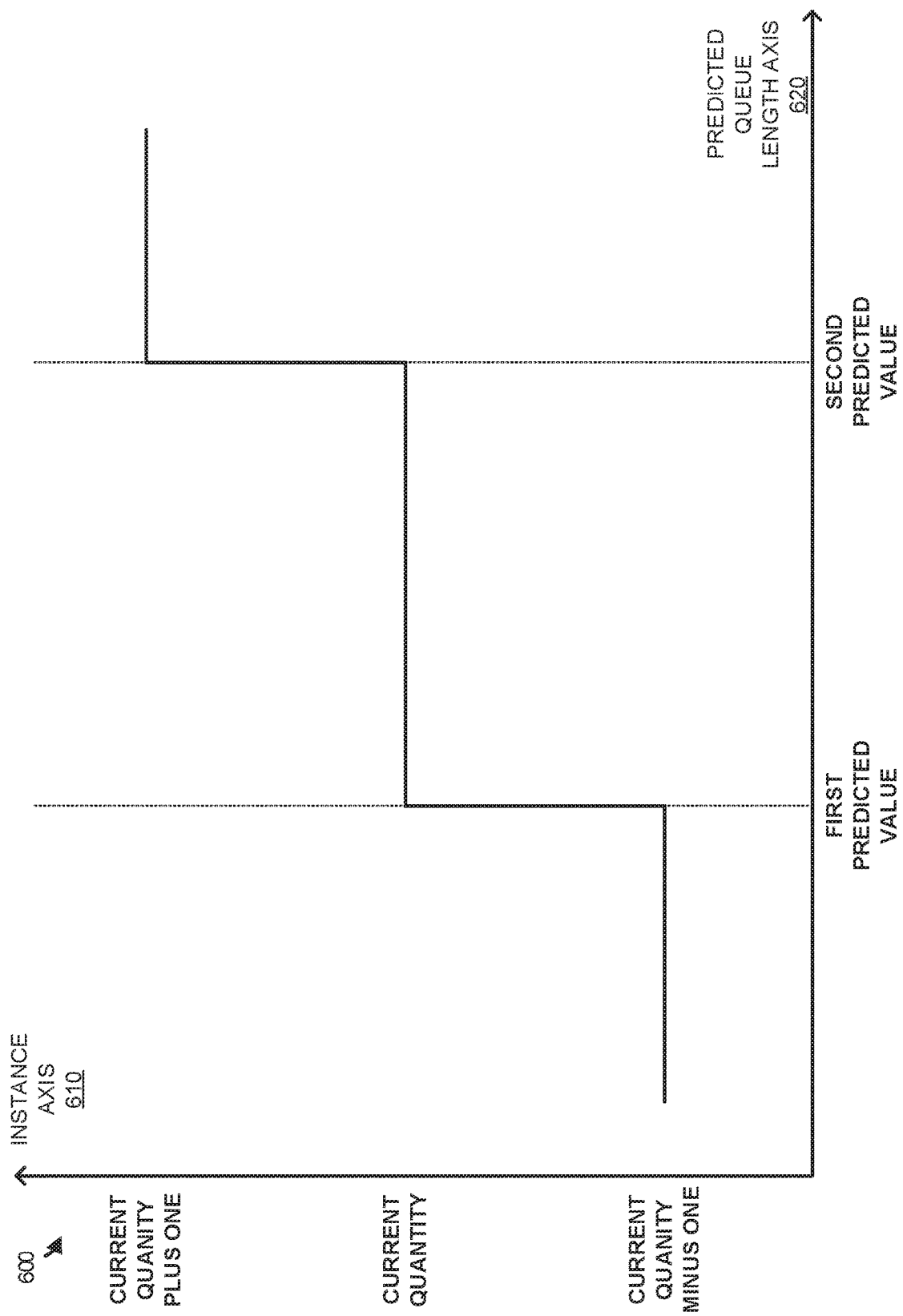
FIG. 6 illustrates a graph for managing data processing systems in a computing environment according to an implementation.

Although demonstrated as a single data structure in the present implementation, it should be understood that multiple data structures and/or functions may be used to determine the predicted queue length. In some implementations, the predicted queue length may be generated periodically, however, it should be understood that the predicted queue length may be generated at any interval by the data processing management system FIG. 6 illustrates a graph 600 for managing data processing systems in a computing environment according to an implementation. Graph 600 includes a vertical instance axis 610, which is representative of a number of data processing systems active in the computing environment, and a horizontal predicted queue length axis 620, which represents a predicted queue length generated by a data processing management system, such as data processing management system 140 of FIG. 1.

As depicted in graph 600, as the predicted queue length increases, the quantity of data processing systems required also increases. As a result, to compensate in fluctuations in the predicted queue length, a data processing management system may modify the operational state of one or more of the systems to ensure that an adequate quality of service is provided to process the data objects in the queue. In some implementations, in determining when to change the operational state of a data processing system, the data processing management system may consider a processing time requirement for data objects in the queue. This data processing time requirement may be a target processing time for data objects, a maximum data processing time for data objects, or some other similar time requirement, including combinations thereof.

Here, instance axis 610 indicates a current quantity of processing instances, a current quantity plus one quantity of processing instances, and a current quantity minus one quantity of processing instances. Using graph 600, so long as the predicted queue length using the current quantity of processing system instances falls within the first predicted value and the second predicted value, then the current quantity of instances is capable of processing the data objects in the computing environment. However, if the predicted queue length falls below the first predicted value, then the data processing management system may decrease the number of data processing systems that are active in the environment. Similarly, if the predicted queue length goes above the second predicted value, then the data processing management system may increase the number of data processing systems that are active in the environment.

Although demonstrated in the previous example as increasing or decreasing by a single data processing instance, it should be understood that similar operations may be employed in increasing or decreasing by multiple data processing systems. For example, if a large spike in the number of data objects in the allocation queue of a computing environment is identified, the data processing management system may use a formula or graph similar to that of graph 600 to identify multiple data processing systems to add to the computing environment.

Figure 7:
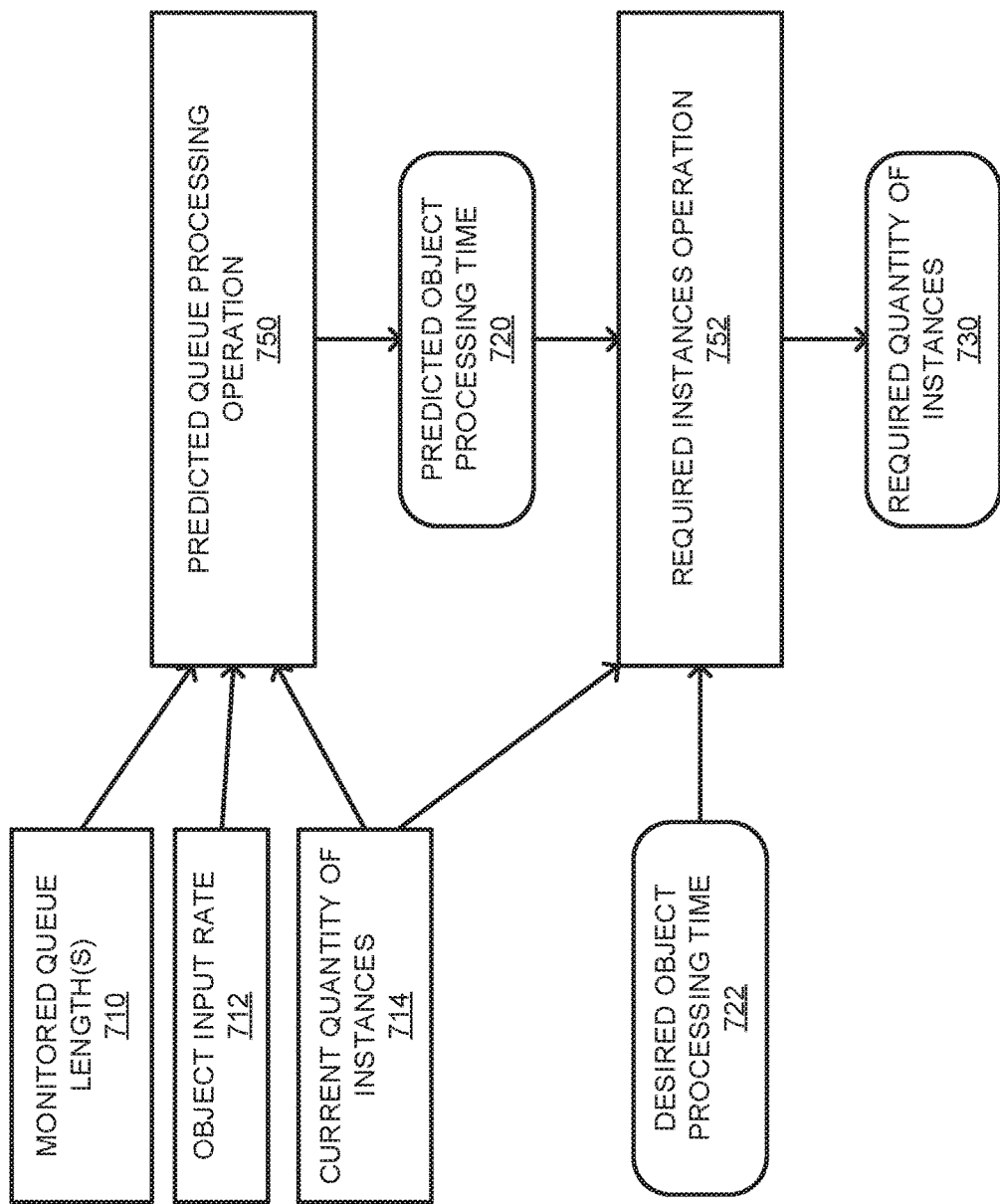
FIG. 7 illustrates an operational scenario of managing data processing systems in a computing environment according to an implementation.

FIG. 7 illustrates an operational scenario 700 of managing data processing systems in a computing environment according to an implementation. Operational scenario 700 includes predicted queue processing operation 750 and required instances operation 752. Operational scenario 700 further includes monitored queue length(s) 710, object input rate 712, current quantity of instances 714, predicted object processing time 720, desired object processing time 722, and required quantity of instances 730. FIG. 7 is an example algorithm for a data processing management system to determine a required number of instances based on a predicted queue length and a processing time requirement for data objects, however, it should be understood that other algorithms may also be used.

As depicted, predicted queue processing operation 750 uses information about a computing environment to determine a predicted object processing time 720. In particular, predicted queue processing operation 750 may take in information about monitored queue length(s) 710 of an allocation queue in the processing environment, an object input rate 712 corresponding to the number of objects that are added to the queue over time, and a current quantity of instances 714 that can be used in defining a data object processing rate for the objects that are in the queue. From the computing environment processing information, predicted queue processing operation 750 may determine a predicted queue length using the currently available quantity of data processing systems. This predicted queue length may also be used in determining a time for data objects to be processed for the queue. In particular, predicted object processing time 720 reflects the amount of time that it would take for an object that enters the queue to be processed using the current instance configuration.

Once the predicted object processing time 720 is determined, required instances operation 752 may be used to process the predicted object processing time 720 with the desired object processing time 722 and the current quantity of instances 714 to determine required quantity of instances 730. In particular, if the predicted object processing time 720 were a threshold amount greater than desired object processing time 722, then required instance operation 752 may identify a required quantity of instances that is greater than the current quantity of instances. In contrast, if the predicted object processing time were lower than the desired object processing time, then required instance operation 752 may identify a required quantity of instances that is less than the current quantity of instances. Once the number of instances are identified, required instance operation 752 may perform a state change to make a processing system available or perform a state change to make a processing system unavailable.

Figure 8:
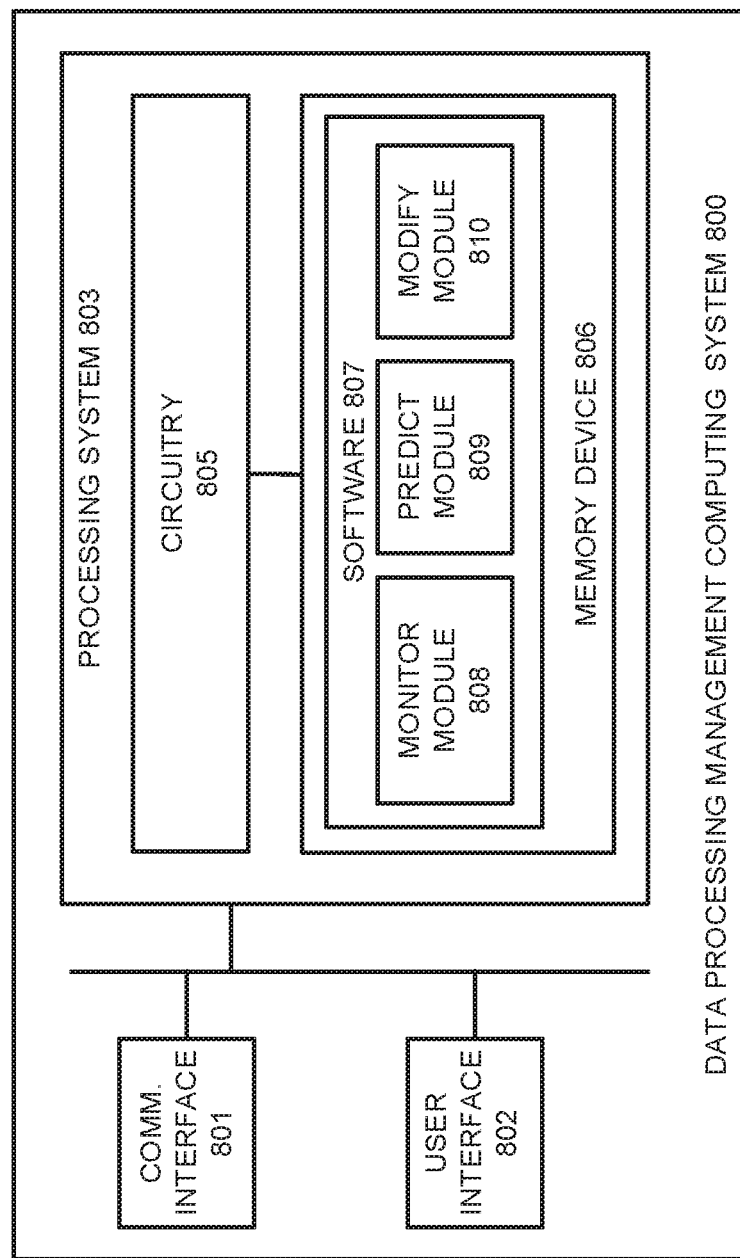
FIG. 8 illustrates a data processing management computing system according to an implementation.

FIG. 8 illustrates a data processing management computing system 800 to initiate virtual clusters according to an implementation. Computing system 800 is representative of any computing system or systems with which the various operational architectures, processes, scenarios, and sequences disclosed herein for a data processing management system may be implemented. Computing system 800 is an example of data processing management system 140, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate with an allocation service and data processing systems in a computing environment, wherein the allocation service is used to maintain an allocation queue for the data processing systems, and wherein computing system 800 is used to make active or inactive data processing systems in the computing environment.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes monitor module 808, predict module 809, and modify module 810, although any number of software modules may provide a similar operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, monitor module 808, when read and executed by processing system 803, directs processing system 803 to monitor a queue length in an allocation queue for data processing by data processing systems in a computing environment. In monitoring the queue length monitor module 808 may identify various attributes of the allocation queue, including the length of the queue at different times, the rate at which data objects are being added to the queue, the rate at which data objects are being processed by the data processing systems, or some other similar information about the allocation queue, including combinations thereof. In some implementations, computing system 800 may be configured with information about the processing rate for each of the data processing systems in the computing environment. In particular, computing system 800 may predict the processing rate for the active data processing systems based on an average time for each of the data processing systems to process a single data object. In some examples, each of the data processing systems may process data objects at the same rate, however, it should be understood that available data processing systems may process the data objects at different rates.

As the allocation queue is monitored by computing system 800, predict module 809 directs processing system 803 to generate a prediction of allocation queue based on the monitored queue length. This prediction may be based on two or more identified queue lengths at different times, may be based on the current rate of data objects entering the queue, and may be based on the current processing rate by the data processing systems in the computing environment. Once the predicted queue length is identified, modify module 810 may modify an operational state of at least one data processing system based on the prediction and a processing time requirement for data objects in the allocation queue.

In at least one implementation, in determining whether to modify an operational state of a data processing system, modify module 810 may use the predicted allocation queue length to identify whether the currently available data processing systems can satisfy the predicted allocation queue. For example, if three data processing systems were currently available in the computing environment for processing the data objects, computing system 800 may have a queue length range, wherein if the predicted queue length were in the range, then the currently executing data processing systems may be capable of processing the data objects. In contrast, it the predicted queue length were greater than the range, then modify module 810 may modify an operational state of at least one data processing system to make at least one data processing system available to process the data objects. These modifications may include initiating execution of the at least one data processing system, changing the machine from a sleep state to an awake/active state, or some other similar operational modification to add the at least one data processing system to the available data processing systems. In another implementation, if the predicted queue length were lesser than the range for the three data processing systems, then modify module 810 may modify an operational state of at least one of the active data processing systems to make the at least one data processing system inactive. This modification to the operational state may include turning off the data processing system, putting the data processing system in a sleep mode, or any other similar modification to the operational state that makes the at least one data processing system inactive for the allocation service.

In some implementations, predict module 809 may use recently identified allocation queue lengths in predicting the allocation queue length. For example, predict module 809 may use two or more queue lengths in the last ten minutes to determine predicted queue lengths for the next ten minutes. In other implementations, predict module 809 may use periodic trends and/or tendencies of the allocation queue to determine a predicted queue length. For example, predict module 809 may identify a predicted queue length based on a queue length trend identified based on the time of day (e.g. a queue length that occurs at the same time of day). From the predicted queue length, modify module 810 may make the required changes in the computing environment to increase or decrease the computing resources.

Returning to the elements of FIG. 1, allocation service 105, data processing systems 110-113, and data processing management system 140 may each comprise communication interfaces, network interfaces, processing systems, computer systems, microprocessors, storage systems, storage media, or some other processing devices or software systems, and can be distributed among multiple devices. Examples of allocation service 105, data processing systems 110-113, and data processing management system 140 can include software such as an operating system, logs, databases, utilities, drivers, networking software, and other software stored on a computer-readable medium. allocation service 105, data processing systems 110-113, and data processing management system 140 may comprise server computing systems, desktop computing systems, laptop computing systems, or any other computing system, including combinations thereof.

Data object storage 150 may reside on any computing system or systems that can include communication interfaces, network interfaces, processing systems, computer systems, microprocessors, storage systems, storage media, or some other processing devices or software systems, and can be distributed among multiple devices. Data object storage 150 may be located on one or more server computing systems, desktop computing systems, laptop computing systems, or any other computing system, including combinations thereof.

Communication between allocation service 105, data processing systems 110-113, data processing management system 140, and data object storage 150 may use metal, glass, optical, air, space, or some other material as the transport media. Communication between allocation service 105, data processing systems 110-113, data processing management system 140, and data object storage 150 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between allocation service 105, data processing systems 110-113, data processing management system 140, and data object storage 150 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of scaling data processing systems to process data objects in an allocation queue, the method comprising:
monitoring a queue length at two or more different times in the allocation queue for data processing by a plurality of data processing systems;

generating a prediction of the allocation queue based on the monitored queue length at the two or more different times; and in response to generating the prediction, modifying an operational state of at least one data processing system of the plurality of data processing systems based on the prediction of the queue length and a processing time requirement for the data objects to be processed from the allocation queue, wherein the at least one data processing system comprises a computing system, and wherein modifying the operational state comprises making the at least one data processing system active or inactive.

2. The method of claim 1, wherein modifying the operational state of the at least one data processing system comprises:
powering on the at least one data processing system; or
changing the at least one data processing system from a sleep state to an awake state.

3. The method of claim 1, wherein modifying the operational state of the at least one data processing system comprises:
powering off the at least one data processing system; or
changing the at least one data processing system from an awake state to a sleep state.

4. The method of claim 1, wherein monitoring the queue length comprises identifying a processing rate for currently available data processing systems for the allocation queue.

5. The method of claim 1, wherein monitoring the queue length comprises identifying a rate of incoming data objects for the allocation queue.

6. The method of claim 1, wherein the processing time requirement comprises a target completion time for a data object in the allocation queue.

7. The method of claim 1, wherein the processing time requirement comprises a maximum completion time for a data object in the allocation queue.

8. A computing apparatus comprising:
one or more non-transitory computer readable storage media;
a processing system operatively coupled to one or more non-transitory computer readable storage media; and
program instructions stored on the one or more non-transitory computer readable storage media that scale data processing systems to process data objects in an allocation queue that, when read and executed by the processing system, direct the processing system to at least:
monitor a queue length at two or more different times in the allocation queue for data processing by a plurality of data processing systems;
generate a prediction of the allocation queue based on the monitored queue length at the two or more different times; and
in response to generating the prediction, modify an operational state of at least one data processing system of the plurality of data processing systems based on the prediction of the queue length and a processing time requirement for the data objects to be processed from the allocation queue, wherein the at least one data processing system comprises a computing system, and wherein modifying the operational state comprises making the at least one data processing system active or inactive.

9. The computing apparatus of claim 8, wherein the program instructions that direct the processing system to modify the operational state of the at least one data processing system comprise program instructions that direct the processing system to:
power on the at least one data processing system; or
change the at least one data processing system from a sleep state to an awake state.

10. The computing apparatus of claim 8, wherein the program instructions that direct the processing system to modify the operational state of the at least one data processing system comprise program instructions that direct the processing system to:
power off the at least one data processing system; or
change the at least one data processing system from an awake state to a sleep state.

11. The computing apparatus of claim 8, wherein the program instructions that direct the processing system to monitor the queue length comprise program instructions that direct the processing system to identify a processing rate for currently available data processing systems for the allocation queue.

12. The computing apparatus of claim 8, wherein the program instructions that direct the processing system to monitor the queue length comprise program instructions that direct the processing system to identify a rate of incoming data objects for the allocation queue.

13. The computing apparatus of claim 8, wherein the processing time requirement comprises a target completion time for a data object in the allocation queue.

14. The computing apparatus of claim 8, wherein the processing time requirement comprises a maximum completion time for a data object in the allocation queue.

15. A system to scale data processing systems to process data objects in an allocation queue, the system comprising:
the data processing systems; and
a data processing management system configured to,
monitor a queue length at two or more different times in the allocation queue for data processing;
generate a prediction of the allocation queue based on the monitored queue length at the two or more different times; and
in response to generating the prediction, modify an operational state of at least one data processing system of the data processing systems based on the prediction of the queue length and a processing time requirement for the data objects to be processed from the allocation queue, wherein the at least one data processing system comprises a computing system, and wherein modifying the operational state comprises making the at least one data processing system active or inactive.

16. The system of claim 15, wherein modifying the operational state of the at least one data processing system comprises:
powering on the at least one data processing system; or
changing the at least one data processing system from a sleep state to an awake state.

17. The system of claim 15, wherein modifying the operational state of the at least one data processing system comprises:
powering off the at least one data processing system; or
changing the at least one data processing system from an awake state to a sleep state.

18. The system of claim 15, wherein monitoring the queue length comprises:
identifying a processing rate for currently available data processing systems for the allocation queue; and identifying a rate of incoming data objects for the allocation queue.

\* \* \* \* \*